United States Patent
Barwicz et al.

(10) Patent No.: US 9,684,133 B2
(45) Date of Patent: Jun. 20, 2017

(54) COMPONENT ASSEMBLY APPARATUS

(71) Applicant: International Business Machines Corporation, Armonk, NY (US)

(72) Inventors: Tymon Barwicz, Westchester (CA); Nicolas Boyer, Quebec (CA); Guy Brouilette, Quebec (CA); Paul F. Fortier, Quebec (CA); Stephane Harel, Quebec (CA); Roch Thivierge, Quebec (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 14/494,008

(22) Filed: Sep. 23, 2014

(65) Prior Publication Data

US 2016/0085044 A1    Mar. 24, 2016

(51) Int. Cl.
    *G02B 6/46*    (2006.01)
    *G02B 6/36*    (2006.01)

(52) U.S. Cl.
    CPC ......... *G02B 6/3636* (2013.01); *G02B 6/3616* (2013.01)

(58) Field of Classification Search
    CPC .... B23P 6/007; B23P 9/02; B23P 9/04; C21D 10/005; C21D 2221/00; C21D 7/06
    See application file for complete search history.

(56) References Cited

U.S. PATENT DOCUMENTS

| | | | |
|---|---|---|---|
| 5,357,593 A | 10/1994 | Bossler | |
| 5,678,468 A | 10/1997 | Lozano Bonet | |
| 6,053,029 A * | 4/2000 | Nakajima | F16J 15/3296 73/9 |
| 6,078,186 A * | 6/2000 | Hembree | G01R 31/2886 324/750.19 |
| 6,774,651 B1 | 8/2004 | Hembree | |
| 7,348,786 B2 | 3/2008 | Thacker | |
| 7,355,386 B2 * | 4/2008 | Siade | H01L 21/681 324/757.04 |
| 7,548,673 B2 | 6/2009 | Azimi | |
| 7,587,108 B2 | 9/2009 | Carpenter | |
| 8,036,508 B2 | 10/2011 | Bhagavatula | |
| 8,752,283 B2 | 6/2014 | Barwicz | |

(Continued)

OTHER PUBLICATIONS

List of IBM Patents or Patent Applicaqtions Treated as Related; (Appendix P), filed Aug. 4, 2014; 2 pages.

(Continued)

*Primary Examiner* — Minh Trinh
(74) *Attorney, Agent, or Firm* — Cantor Colburn LLP; Vazken Alexanian

(57) ABSTRACT

A component assembly apparatus includes a first device supportive of a first component and a second device configured to bring a second component into contact with the first component. The second device is further configured to apply a first pressurizing force directed to force respective first surfaces of the first and second components together, and the first device is configured to convert a portion of the first pressurizing force into a second pressurizing force directed transversely with respect to the first pressurizing force to force respective second surfaces of the first and second components together.

10 Claims, 7 Drawing Sheets

(56) References Cited

U.S. PATENT DOCUMENTS

2009/0265924 A1* 10/2009 Ebihara .................. H01L 24/75
                                                            29/739
2013/0283584 A1* 10/2013 Barwicz ............. H05K 13/0404
                                                            29/281.4
2016/0085044 A1*  3/2016 Barwicz ............... G02B 6/3616
                                                            29/428

OTHER PUBLICATIONS

T. Tekin, "Review of packaging of optoelectronic, photonic, and MEMS components." IEEE Journal of Selected Topics in Quantum Electronics, vol. 17, No. 3, 2011, pp. 704-719.
Tymon Barwicz et al.; "Picktip Having Non-Planar Topography", U.S. Appl. No. 14/493,980, filed Sep. 23, 2014.

* cited by examiner

COMPONENT ASSEMBLY APPARATUS

BACKGROUND

The present invention relates to a component assembly apparatus and, more particularly, to a component assembly apparatus including a single picker and a single application of force.

In certain technological fields, a component having optical fibers needs to be attached to a photonic device having a waveguide. A cost effective approach to complete this attachment is to use a high throughput standard pick-'n-place tool, like those used in the semiconductor industry. Thus, during the fiber attachment process, the fibers need to be pressed down into alignment grooves of the photonic device and then the fibers must be slid down the grooves in order for the ends of the fibers to come into contact with the ends of the grooves. This contact is needed in order to have the core of the fibers butt-coupled against the waveguide, which will in turn allow for efficient light coupling as light travels from the fibers to the waveguide and vice versa. Standard pick-'n-place tools do not have the capability for providing the horizontal slide motion during the assembly process.

Standard pick-'n-place tools work in the following manner. A substrate or chip (i.e., the part the component will be placed on) sits on a fixed base and the component is picked up by a motion arm. The component and the substrate/chip are then aligned in the X and Y-axes and the motion arm moves down in the Z-axis to place the component on the substrate/chip. The tip of the motion arm normally has a pressure detector in order to control the force of contact.

Typically, however, the motion arm does not have the capability to make a precise horizontal motion needed to butt-couple the fibers and the waveguide once the components have been placed together. Moreover, even if such precise horizontal motion were possible, the motion arm does not generally have pressure controls in X and Y displacement directions in order to control the force of the butt-couple.

SUMMARY

According to an embodiment of the present invention, a component assembly apparatus includes a first device supportive of a first component and a second device configured to bring a second component into contact with the first component. The second device is further configured to apply a first pressurizing force directed to force respective first surfaces of the first and second components together, and the first device is configured to convert a portion of the first pressurizing force into a second pressurizing force directed transversely with respect to the first pressurizing force to force respective second surfaces of the first and second components together.

According to another embodiment, a component and chip assembly apparatus includes a base supportive of a chip having grooves for optical fiber alignment and a picker configured to bring a chip component including optical fibers into contact with the chip such that the optical fibers are groove aligned. The picker is further configured to apply a force directed along a Z-axis to force respective first surfaces of the chip and the chip component together, and the base is configured to convert a portion of the Z-axis force into a force directed along at least one of X and Y-axes to force respective second surfaces of the chip and the chip component together.

According to yet another embodiment, a method for assembling components includes placing a bottom component on a base fixture with a sliding part and an angled part, which is angled with respect to a Z-axis, picking a top component using a picker and positioning the top component with respect to the bottom component in X and Y-axes and bringing the top and bottom components into contact through Z-axis motion between the picker and the base and continuing the Z-axis motion to engage a sliding motion of the sliding part along the angled part in opposition to a bias applied to the sliding part in opposition to the sliding motion.

DETAILED DESCRIPTION

As will be described below, a component assembly apparatus is provided for component assembly processing requiring motion/force application in two or more axes. The component assembly apparatus does not require a switching of assembly devices or base rotation. In addition, the component assembly apparatus provides for force control and thus reduces a risk that the components being brought together will be damaged or, conversely, allows them to be designed with less concern given toward fragility.

Figure 2:
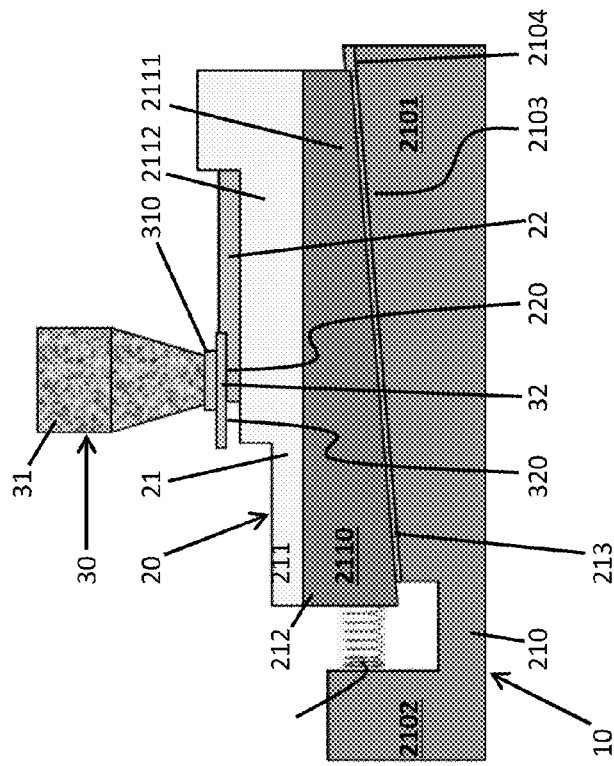
FIG. 2 is a schematic side view of the component assembly apparatus of FIG. 1.
Figure 1:
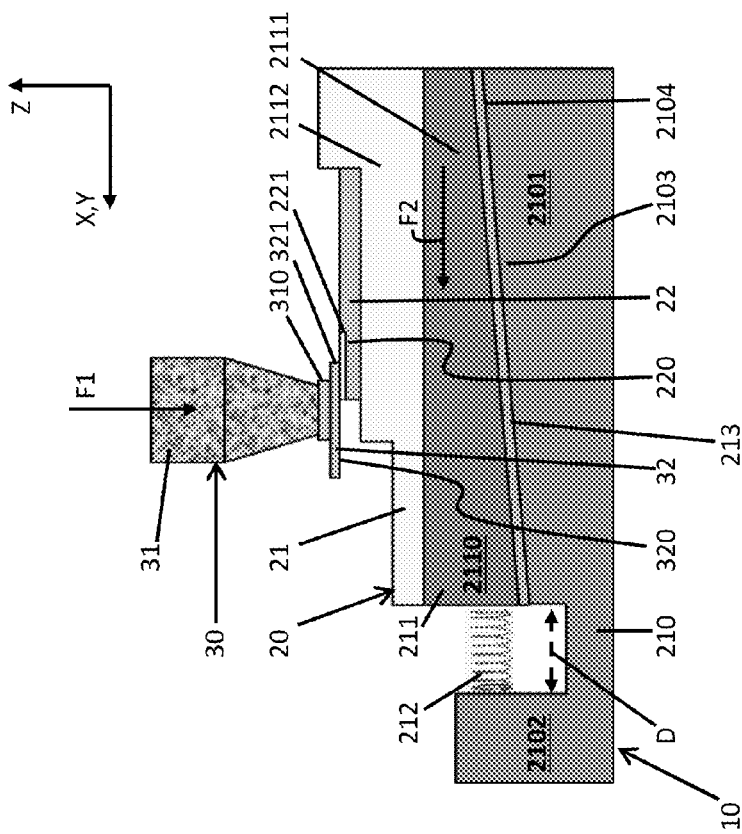
FIG. 1 is a schematic side view of a component assembly apparatus in accordance with embodiments.

With reference to FIGS. 1 and 2, a component assembly apparatus 10 is provided and includes a first device 20 and a second device 30. The first device 20 may be provided as a base 21 and is supportive of a first component 22. The first component 22 may be, for example, a substrate or chip having grooves defined along a first surface 220 and a waveguide abutting a second surface 221 where the first and second surfaces 220, 221 are transverse to one another. The second device 30 may be provided as a picktip or picker 31 and is configured to pick up a second component 32 and to bring the second component 32 into contact with the first component 22. The second component 32 may be, for example, a chip component having optical fibers disposed to extend along a first surface 320 to a second surface 321 where the first and second surfaces 320, 321 are transverse to one another and complementary with respect to the first and second surfaces 220, 221 of the first component 22.

The picking up of the second component 32 by the second device 30 may be achieved by movement of the second device 30 in X and Y axes to reach the position of the second component 32 and then by an additional movement of the second device 30 along a Z-axis to bring the second device 30 into contact with the second component 32. The bringing of the second component 32 into contact with the first component 22 by the second device 30 may be achieved by an initial alignment of the second component 32 with the first component 22 in the X and Y-axes, which can be verified by an optical element or another suitable verification device, and a subsequent movement of the second device 30 and the second component 32 in a second direction defined along the Z-axis and opposite the first direction.

The second device 30 is further configured to apply a first pressurizing force F1 in the second direction along the Z-axis to force the first surface 320 of the second component 32 and the first surface 220 of the first component 22 together such that the grooves align components on the second component 32, such as the optical fibers. In addition, the first device 20 is configured to convert a portion of the first pressurizing force F1 into a second pressurizing force F2 without the need for a switching out of the second device 30 or a rotation of the first device 20. This second pressurizing force F2 is directed along the X and Y-axes and forces the second surface 221 of the first component 22 towards the second surface 321 of the second component 32. Moreover, the first device 20 is further configured to reduce the application of the second pressurizing force F2.

The second pressurizing force F2 thus acts on the first component 22 through base 21 and is a reactive force that results from the sliding geometry of the first device 20 as described below. The second pressurizing force F2 is generally always present as long as there is a first pressuring force F1 and a non-zero sliding angle. However, the second pressurizing force F2 may not always generate a displacement of the first component 22. As described below, a counterforce may be used on the first device 20 so the second pressurizing force F2 must be larger than the counterforce to generate a displacement. In addition, in an embodiment further described below, it is possible to disengage the first component 22 from the second pressurizing force F2 using a clutch.

The point at which the second surface 321 of the second component 32 and the second surface 220 of the first component 22 are brought into contact may be referred to as a lithographically defined stop. It will be understood that the ability of the first device 20 to stop the application of the second pressurizing force F2 may be independent of the point at which the respective second surfaces 321, 221 come into contact. As such, the respective second surfaces 321, 221 can be forced together by a tunable application of force.

With the respective first surfaces 320, 220 and the respective second surfaces 321, 221 forced together as described above, the first and second components 22 and 32 may be attached to one another. Such attachment may be achieved by adhesive being deposited on at least the first surface 220 prior to the applications of the first and second pressurizing forces F1 and F2 and then being cured following the respective first surfaces 320, 220 and the respective second surfaces 321, 221 being forced together. Alternatively, the attachment may be achieved by thermo-compression processing or a heating of one or both of the respective first surfaces 220, 320 and one or both of the respective second surfaces 221, 321 during the applications of the first and second pressurizing forces F1 and F2.

Where the second device 30 is provided as a picker 31, the second device 30 may include materials that are fully or partially transparent to ultraviolet (UV) light. These materials may be formed to define vacuum pathways extending along a length of the picker 31 and terminating at the end face 310 so that, with the vacuum pathways activated, the picker 31 can pick up the second component 32 and hold the second component 32 to the end face 310. The UV transparency of the materials allows for UV curing of any adhesive provided between the first and second components 22, 32 through the picker 31 without requiring that the picker 31 be refracted from the second component 32.

Where the first device 20 is provided as a base 21, the first device 20 includes a fixed part 210, a sliding part 211 and a counterforce element 212. In accordance with embodiments, the fixed part 210 includes a fixed base 2101 that extends along an entire length of the first device 20, an anchoring part 2102 that extends from an end of the fixed base 2101 and an angled slide 2103. The angled slide 2103 extends from the fixed base 2101 at a distance D from the anchoring part 2102 and has an upper surface 2104 that is angled relative to the direction of the first pressurizing force F1. The angling of the upper surface 2104 may form an angle of about 1-89 degrees or about 2-30 degrees with respect to the direction of the first pressurizing force F1 and is oriented with decreasing height with decreasing distance from the anchoring part 2102.

The sliding part 211 is disposed to slide along the angled slide 2103 from an initial position (see FIG. 1) to a secondary position (see FIG. 2) and vice versa. The sliding part 211 has a body 2110 with first and second opposite parts 2111 and 2112. The first part 2111 lays upon and faces the angled slide 2103 and has a surface with a same angling as the angled slide 2103 whereas the second part 2112 has a surface that is oriented in parallel with the second component 32 when the first part 2111 lays upon and faces the angled slide 2103. Sliding movement of the sliding part 211 relative to the angled slide 2103 may be facilitated by the first device 20 further including a linear bearing 213 disposed along the angled slide 2103 such that the sliding part 211 rides along the linear bearing 213 when moving from the initial position to the secondary position. The linear bearing 213 could be a magnetic bearing, a ball bearing, a ball thrust bearing or a needle bearing.

The counterforce element 212 is anchored at opposite ends thereof to the anchoring part 2102 of the fixed base 2101 and the body 2110 of the sliding part 211. The counterforce element 212 is thus configured to apply a force to the sliding part 211 in opposition to the movement of the sliding part 211 from the initial position to the secondary position. The secondary position may be defined at a location at which the respective second surfaces 221 and 321 come into contact with each other. In some embodiments, the force applied by the counterforce element 212 may be changed as body 2110 slides so as to achieve a gentle contact between the respective second surfaces 221 and 321.

In accordance with embodiments, the counterforce element 212 is not relied upon to stop the motion of the body 2110. Rather, the motion is stopped by the contact of the respective second surfaces 321 and 221. The counterforce element 212 may be designed to reduce forces exerted on the 321/221 interface to prevent damage to that interface for large instances of the second pressurizing force F2.

With the configurations described above, upon an application of the first pressurizing force F1, the respective first surfaces 320, 220 of the second and first components 32 and 22 are forced together such that the grooves of the first component 22 align, for example, the optical fibers of the second component 32. Meanwhile, the angling of the angled slide 2103 and the first face 2111 of the sliding part 211 serve to trigonometrically convert a portion or component of the first pressurizing force F1 into the second pressurizing force F2. This second pressurizing force F2 causes the sliding part 211 to slide toward the anchoring part 2102 in opposition to the resistance applied by the counterforce element 212. This causes the respective second surfaces 321, 221 of the second and first components 32 and 22 to also become forced together at the lithographically defined stop such that abutment of the optical fibers of the second component 32 and the waveguide of the first component 22 can be made.

In accordance with embodiments, the motion resistance of the counterforce element 212 may be designed to counter excessive application of the second pressurizing force F2 on the 321/221 interface. Thus, damage to either or both of the first and second components 22 and 32 due to the first and second components 22 and 32 being forced together with excessive force may also be avoided. As a further advantage, a need to design the first and second components 22 and 32 to be strong enough to withstand such excessive applications of force can be reduced, and the sizes and strengths of the first and second components 22 and 32 can be designed primarily for performance effects and with reduced concern given to manufacturability than would otherwise be possible.

In accordance with embodiments, the counterforce element 212 may be provided as a compression or torsional spring. As such, at a minimum, the counterforce element 212 can have a linear response and provides for a preload of the sliding part 211 that reduces impact forces between the first and second components 22 and 32. The counterforce element 212 further provides for stability of the sliding part 211 relative to the angled slide 2103 prior to assembly. In accordance with further embodiments, however, the counterforce element 212 may be a pneumatically activated non-linear spring or, with reference to FIG. 3, multiple counterforce elements 212 that sequentially engage with the sliding part 211 and thus effectively act as a non-linear spring.

Figure 3:
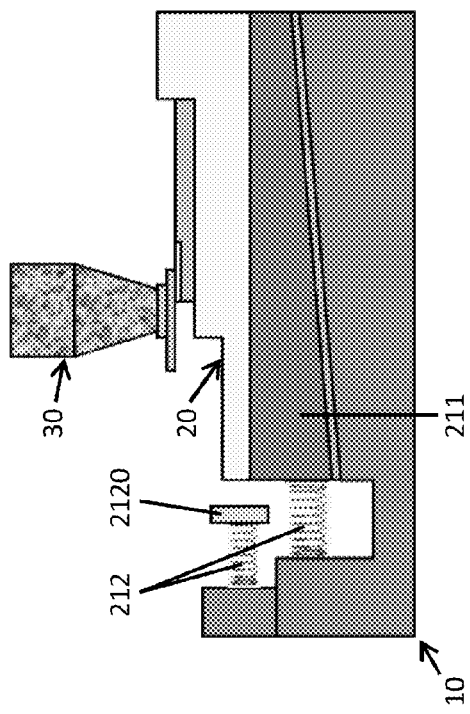
FIG. 3 is a schematic side view of a component assembly apparatus in accordance with further embodiments.

For example, as shown in FIG. 3, while one of the counterforce elements (i.e., a first counterforce element) 212 may be anchored at opposite ends thereof to the anchoring part 2102 of the fixed base 2101 and the body 2110 of the sliding part 211, another counterforce element (i.e., a second counterforce element) 212 may be coupled at only one end thereof to the anchoring part 2102 and have a block element 2120 provided at its distal end. In this case, as above, the counterforce 212 is configured to apply a motion resistance force to the sliding part 211 in opposition to the movement of the sliding part 211 from the initial position to the secondary position. The second counterforce element 212 slows down movement of the sliding part 211 once the sliding part 211 abuts with the block element 2120 and minimizes impact forces between the first component 22 and the second component 32.

Figure 4:
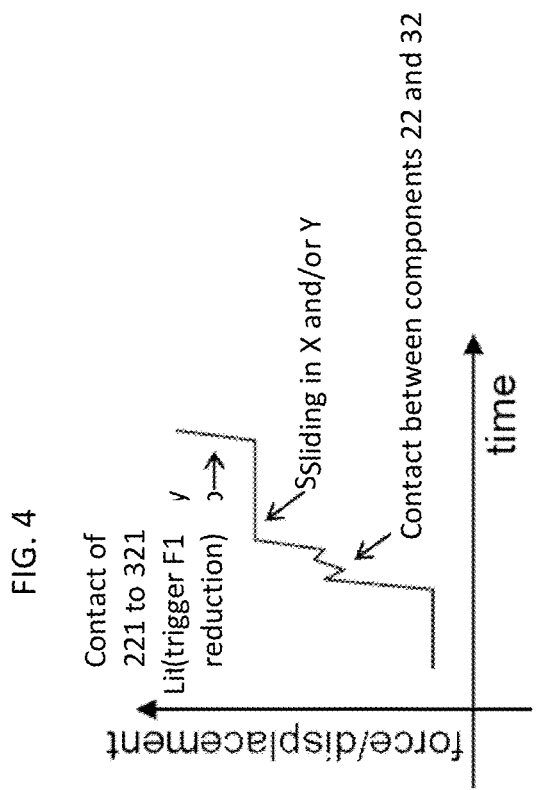
FIG. 4 is a graphical depiction of a programmed end-point for a component assembly apparatus.

For any configuration of the counterforce element 212 and, with reference to FIG. 4, the component assembly apparatus 10 may provide for a programmed end-point. That is, at least one or both of the first and second devices 20 and 30 may be configured to sense applications of force to the first and second components 22 and 32 and/or to sense displacements of the first and second components 22 and 32. Once sensed, the application of force or displacement velocity can be reduced once motion in the X and Y-axes is started. This starting of the X and Y-axis motion due to the contact between the respective first surfaces 220 and 320 of the first and second components 22 and 32 can be sensed from the first transition in the force vs. displacement curve of FIG. 4 and the butting of the respective second surfaces 221 and 321 of the first and second components 22 and 32 can be sensed from the second transition. For example, once contact between the respective second surfaces 221 and 321 is detected, the first pressurizing force F1 could be reduced to stop the Z-movement of the second device 30 and prevent excessive contact force on the 221/321 interface.

Figure 5:
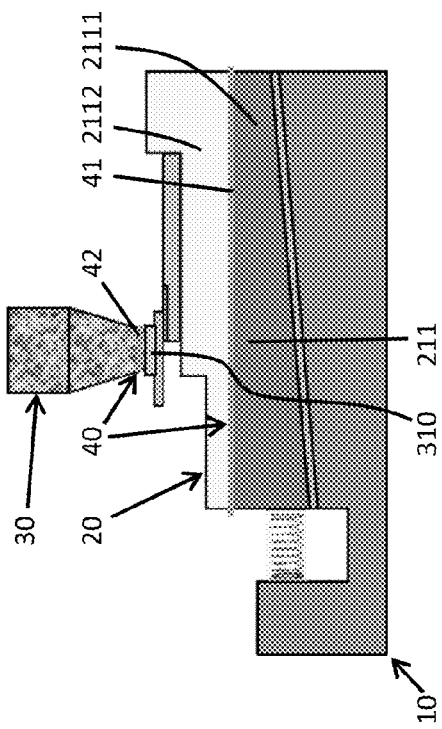
FIG. 5 is a schematic side view of a component assembly apparatus in accordance with further embodiments.

In accordance with further embodiments and, with reference to FIG. 5, at least one or both of the second device 30 and the sliding part 211 may include a mechanical clutch system 40. The mechanical clutch system 40 can employ a vacuum, a magnetic field, etc., and permits the first and second components 20 and 30 to be brought into contact with one another but disengages (or declutches) either or both of the first and second components 22 and 32 from the first and second devices 20 and 30, respectively, once the respective second surfaces 221, 321 come into contact. The mechanical clutch system 40 is designed to disengage at a pre-determined level of X and/or Y axis force between the first and second components 22 and 32. The disengagement force is chosen as to be lower than the force that would cause damage to the first and second components 22 and 32 at the instance of contact between the respective second surfaces 221 and 321.

As shown in FIG. 5, the mechanical clutch system 40 may include at least one of the first clutch element 41 and the second clutch element 42. The first clutch element 41 is disposed between the first and second parts 2111 and 2112 of the sliding part 211 and is configured to disengage the first and second faces 2111 and 2112 once the X and/or Y axis force between the first and second components 22 and 32 exceeds a first predetermined level. The second clutch element 42 is disposed at the end face 310 of the picker 31 and is similarly configured to disengage the end face 310 from the picker 31 once the X and/or Y axis force between the first and second components 22 and 32 exceeds a second predetermined level. Where the first and second clutch elements 41 and 42 are provided in combination, the first and second predetermined levels may be similar to or different from one another providing additional safety for the assembly in the case one of the clutches does not disengage as expected.

Figure 6:
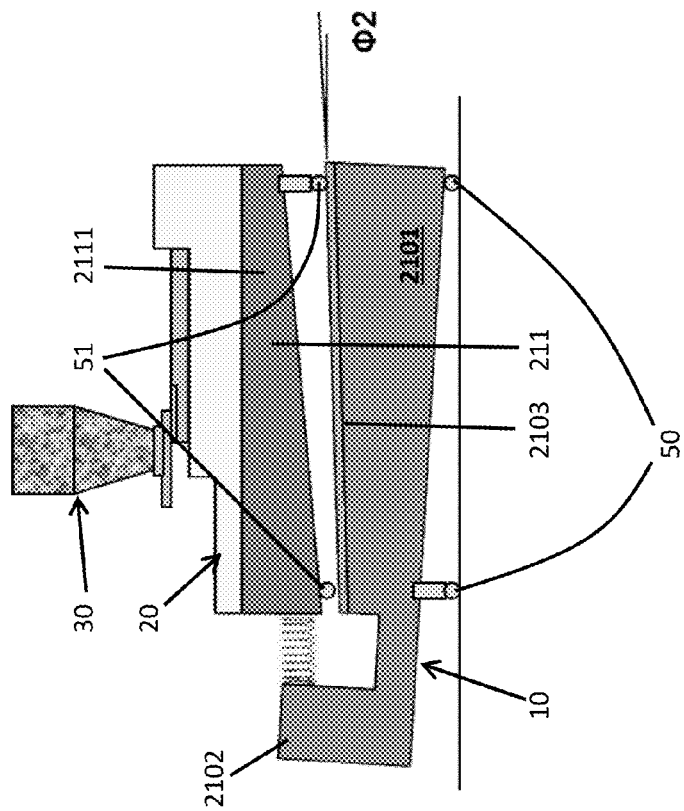
FIG. 6 is a schematic side view of a component assembly apparatus in accordance with further embodiments.
Figure 7:
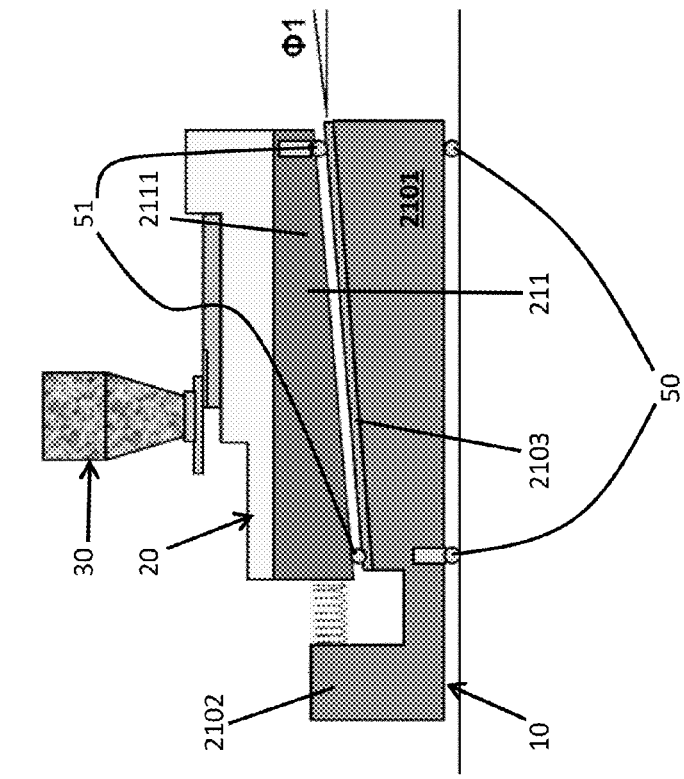
FIG. 7 is a schematic side view of the component assembly apparatus of FIG. 6.

With reference to FIGS. 6 and 7, an angling of the angled slide 2103 relative to the direction of the first pressurizing force F1 and to the angling of the first part 2111 of the sliding part 211 may be changeable in-situ to reduce a magnitude of the second pressurizing force F2 since the shallower the angling of the angled slide 2103, the smaller the portion of the first pressurizing force F1 that is converted into the second pressurizing force F2 will be. As shown in FIGS. 6 and 7, the changeable angling may be achieved by placing first servo mechanisms 50 in a supporting position relative to the fixed base 2101 and by interposing second servo mechanisms 51 between the fixed base 2101 and the sliding part 211. These first and second servo mechanisms 50 and 51 are configured to be elongated to lift a corresponding element to which they are connected.

Thus, in accordance with embodiments, during the assembly process, each servo mechanism is provided with its initial base length and as the assembly process continues, the first servo mechanism 50 proximate to the anchoring part 2102 elongates to shallow out the angling of the angled slide 2103 while the second servo mechanism 51 remote from the anchoring part 2102 elongates to maintain an angling of the first part 2111 (and, by extension, the second part 2112). The shallowing out of the angling of the angled slide 2103 reduces the magnitude of the second pressurizing force F2 and the maintenance of the angling of the first part 2111 (and the second part 2112) maintains the integrity of the contact between the first and second components 22 and 32.

Figure 8:
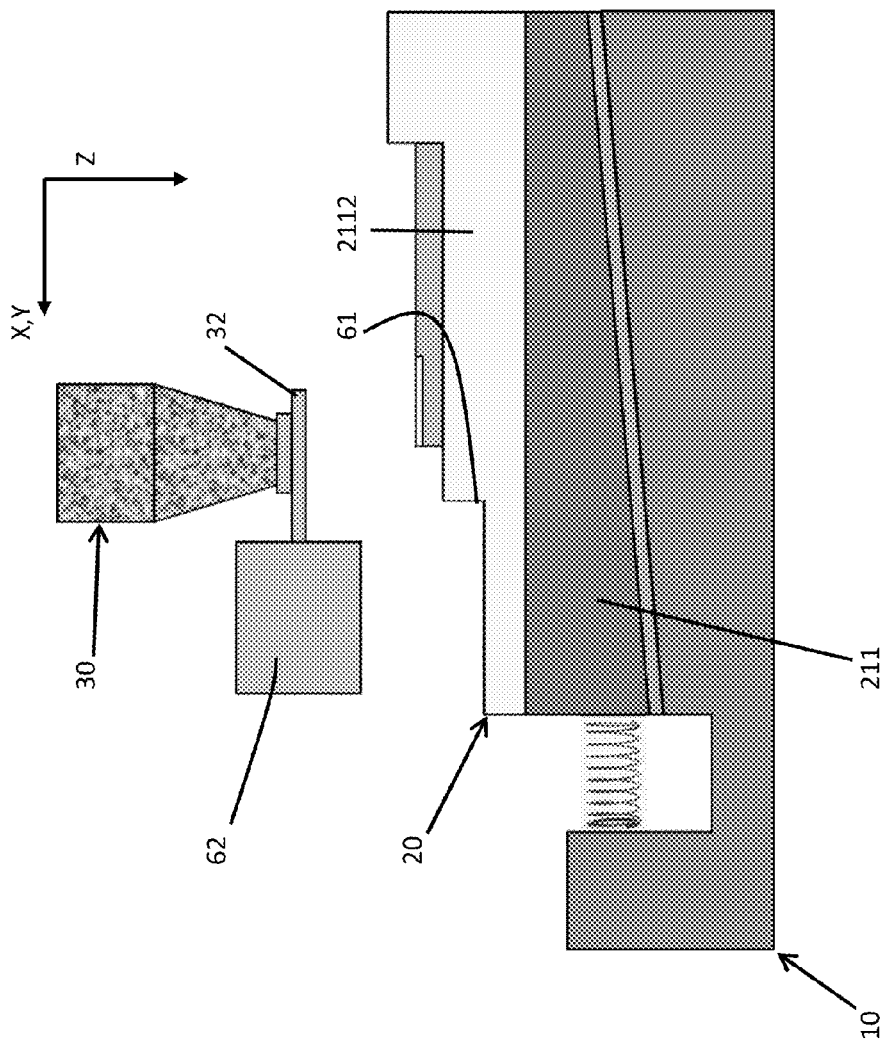
FIG. 8 is a schematic side view of a component assembly apparatus in accordance with further embodiments.

With reference to FIG. 8, the general concepts of FIGS. 1-7 are applied to an exemplary specific case where the second component 32 is a fiber stub and includes a fiber ferrule 62 and one or a plurality of fibers. The fiber ferrule 62 could be, for example, a mechanical transfer (MT) or a Lucent connector (LC) ferrule as known by people of skill in the art. Recess 61 is defined in the second part 2112 to provide space for the fiber ferrule 62 such that the fiber ferrule 62 does not act as a motion stop. The motion is stopped by the end of the fibers of the second component 32 abutting against the waveguide.

Figure 9:
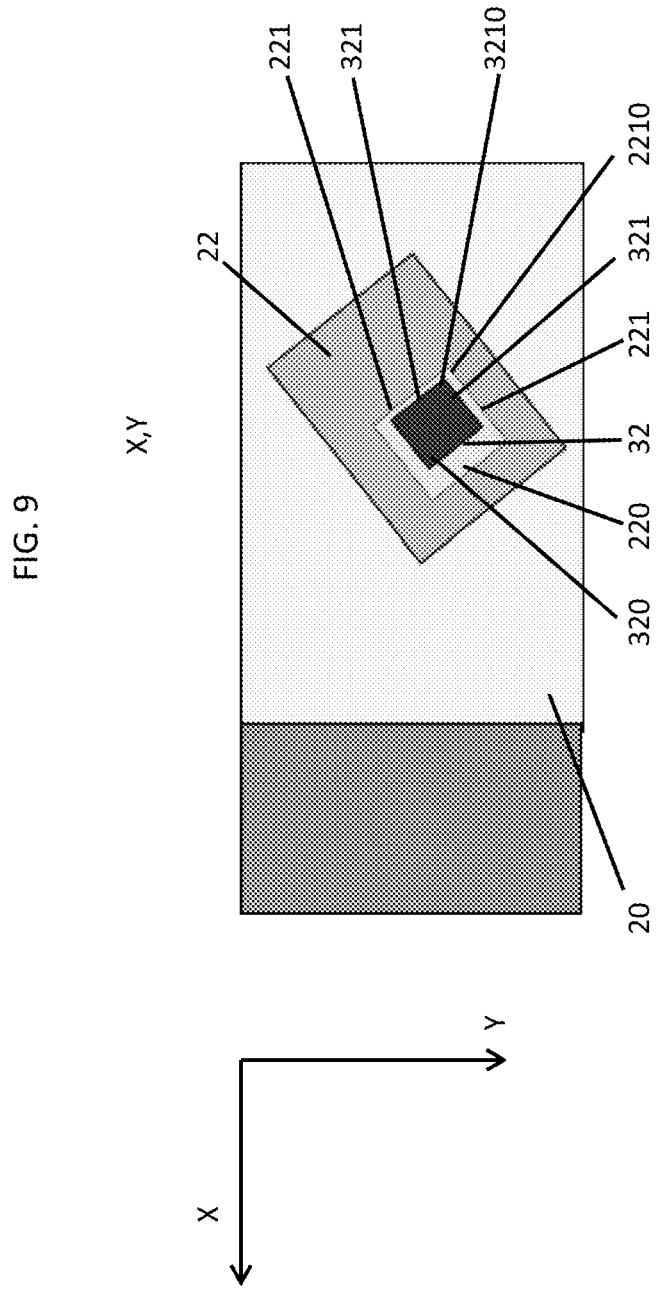
FIG. 9 is a top down view of the component assembly of any of FIGS. 1-8 in accordance with still further embodiments.

In accordance with further embodiments and, with reference to FIG. 9, the first component 22 may include multiple first surfaces 220 and multiple second surfaces 221 and the second component 32 may include multiple first surfaces 320 and multiple second surfaces 321. In particular, the first component 22 may include multiple second surfaces 221 that intersect with one another to form an angle 2210 and the second component 32 may include multiple second surfaces 321 that intersect with one another to form an angle 3210. In such cases, the respective multiple second surfaces 221 and 321 could be two lithographically defined stops on the surface of the first and second components 22 and 32 but need not be located at the edges of the first and second components 22 and 32. Alignments in both X and Y axes can be accomplished if the respective second surfaces 321 and 221 are at an angle with X and the direction of the sliding corresponding to the direction of the second pressurizing force F2 and/or either the first or second component 22 or 32 has the liberty of movement in the Y axis.

In accordance with still further embodiments, in a case where the second device 30 is re-alignable in the X, Y-axes, the alignment of the angles 2210, 3210 can be corrected during the assembly process by the interaction of one of the second surfaces 221 and its complementary second surface 321. In these cases, if one assumes that the application of the second pressurizing force F2 is directed along the X-axis, the interaction of one of the second surfaces 221 and its complementary second surface 321 converts a portion or component of the second pressurizing force F2 into a third pressurizing force. This third pressurizing force could then be directed in, for example, the Y-axis to re-align or to correct an alignment of the angles 2210, 3210.

Figure 10:
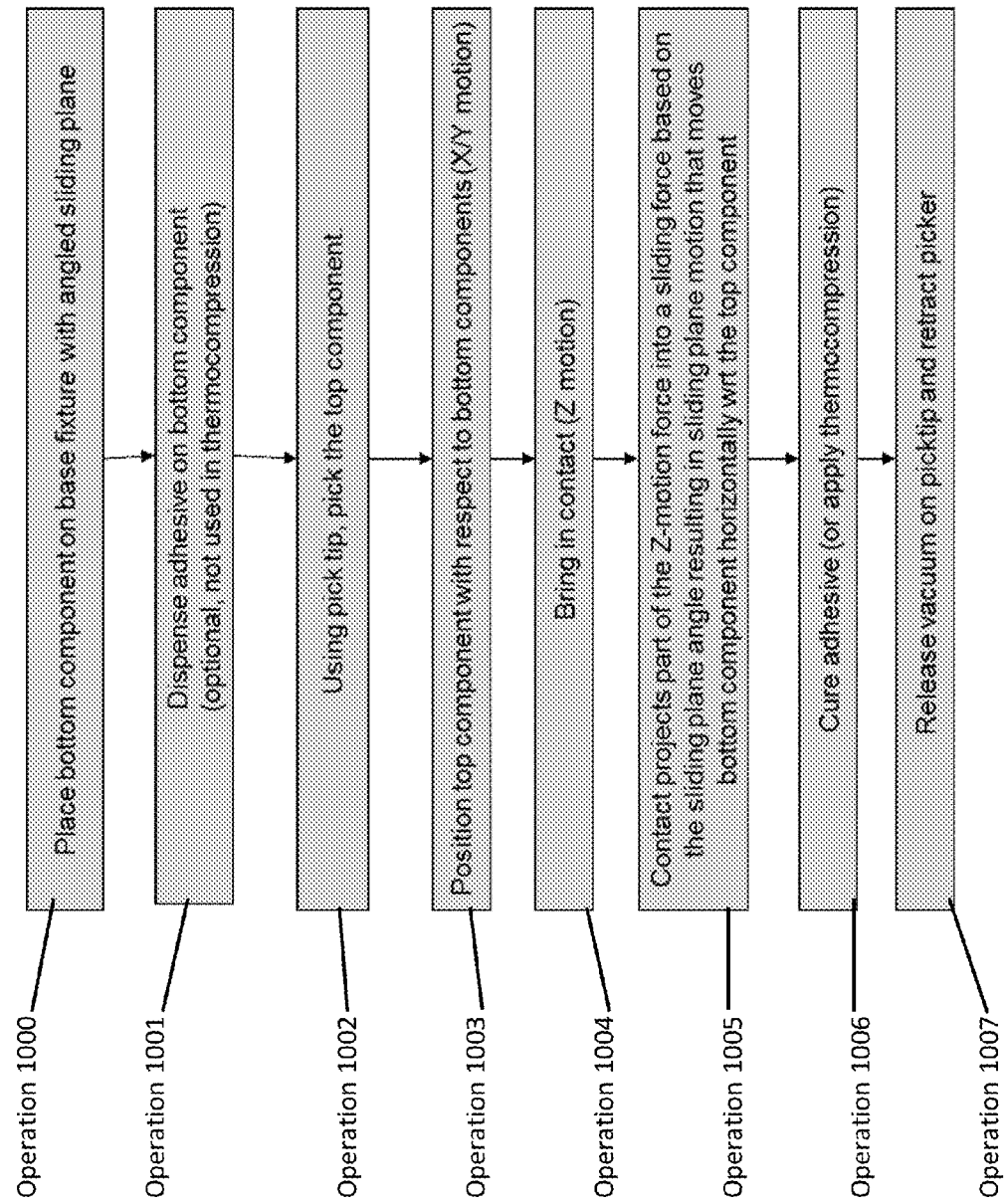
FIG. 10 is a flow diagram illustrating a method of component assembly.

With reference to FIG. 10, a method for assembling components is provided. The method may include placing a bottom component on a base fixture with an angled sliding plane at a 0.1 to 89.9 degree angle to Z-axis motion (operation 1000), optionally dispensing adhesive on the bottom component (operation 1001), picking a top component using a picker (operation 1002) and positioning the top component with respect to the bottom component (X/Y motion) (operation 1003). The method further includes bringing the top and bottom components into contact through Z-axis motion (operation 1004) between the picker and the base, continuing the Z-axis motion to engage a sliding motion of a sliding section of the base along the angled sliding plane (operation 1005) and stopping the Z-axis motion. Finally, the method includes curing the adhesive (operation 1007), releasing the holding mechanism on the picker and retracting the picker (operation 1008).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A component assembly apparatus, comprising:
 a first device supportive of a first component; and
 a second device configured to bring a second component into contact with the first component,
 the second device being further configured to apply a first pressurizing force directed to force respective first surfaces of the first and second components together, and
 the first device being configured to convert a portion of the first pressurizing force into a second pressurizing force directed transversely with respect to the first pressurizing force to force respective second surfaces of the first and second components together,
 wherein the second device comprises a picktip and the first device comprises:
 a fixed part including an angled slide, which is angled relative to the first pressurizing force;
 a sliding part disposed to slide along the angled slide; and
 a counterforce element anchored on the fixed and sliding parts to apply motion resistance to the sliding part.

2. The apparatus according to claim 1, wherein the second component comprises optical fibers and the first component comprises grooves for optical fiber alignment.

3. The apparatus according to claim 1, wherein the first and second components each comprise multiple second surfaces at an angle with the second pressurizing force.

4. The apparatus according to claim 1, wherein the angled slide comprises a linear bearing.

5. The apparatus according to claim 1, wherein the sliding part comprises an angled surface which has a same angling as the angled slide.

6. The apparatus according to claim 1, wherein the counterforce element comprises one of a non-linear spring and multiple elastic elements that sequentially engage with the sliding part.

7. The apparatus according to claim 1, wherein at least one of the second device and the sliding part comprises a clutch element that disengages automatically at a predetermined force.

8. The apparatus according to claim 1, wherein an angling of the angled slide is changeable.

9. The apparatus according to claim 1, further comprising a mechanism of force reduction based on the sensed force versus displacement of the components.

10. A component assembly apparatus, comprising:
 a first device supportive of a first component; and
 a picktip configured to bring a second component into contact with the first component and to apply a first pressurizing force directed to force respective first surfaces of the first and second components together, and
 the first device comprising a fixed part including a slide angled relative to the first pressurizing force, a sliding part disposed to slide on the slide and a counterforce element that is anchored to the fixed part and the sliding part to resist sliding motion of the sliding part such that the first pressurizing force is partially converted into a second pressurizing force directed transversely with respect to the first pressurizing force to force respective second surfaces of the first and second components together.

\* \* \* \* \*